US008321701B2

(12) United States Patent
Obr et al.

(10) Patent No.: US 8,321,701 B2
(45) Date of Patent: Nov. 27, 2012

(54) ADAPTIVE FLUSHING OF STORAGE DATA

(75) Inventors: Nathan Steven Obr, Bellevue, WA (US); Andrew Herron, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 481 days.

(21) Appl. No.: 12/501,227

(22) Filed: Jul. 10, 2009

(65) Prior Publication Data

US 2011/0010569 A1  Jan. 13, 2011

(51) Int. Cl.
G06F 1/32 (2006.01)
G06F 1/00 (2006.01)
G06F 12/00 (2006.01)
G06F 13/00 (2006.01)
G06F 11/00 (2006.01)

(52) U.S. Cl. ........ 713/320; 713/300; 711/118; 711/135; 711/142; 711/143; 714/15

(58) Field of Classification Search .................. None
See application file for complete search history.

(56) References Cited

U.S. PATENT DOCUMENTS

| | | | | |
|---|---|---|---|---|
| 5,341,503 A * | 8/1994 | Gladstein et al. | ............. | 713/340 |
| 6,052,789 A | 4/2000 | Lin | | |
| 6,157,169 A * | 12/2000 | Lee | ............... | 320/132 |
| 7,028,220 B2 * | 4/2006 | Park | ............... | 714/22 |
| 7,171,186 B2 * | 1/2007 | Miyachi et al. | ............. | 455/343.5 |
| 7,225,347 B2 | 5/2007 | Dai et al. | | |
| 7,421,591 B2 | 9/2008 | Sultenfuss et al. | | |
| 7,536,506 B2 * | 5/2009 | Ashmore et al. | ............. | 711/114 |
| 2002/0087588 A1 * | 7/2002 | McBride et al. | ............. | 707/204 |
| 2005/0071561 A1 * | 3/2005 | Olsen et al. | ............. | 711/118 |
| 2005/0144486 A1 | 6/2005 | Komarla et al. | | |
| 2006/0136765 A1 | 6/2006 | Poisner et al. | | |
| 2006/0212644 A1 | 9/2006 | Acton et al. | | |
| 2007/0074053 A1 | 3/2007 | Bulusu et al. | | |
| 2007/0112999 A1 | 5/2007 | Oney et al. | | |
| 2007/0174573 A1 * | 7/2007 | Shiota et al. | ............. | 711/163 |
| 2007/0288782 A1 * | 12/2007 | Chang et al. | ............. | 713/323 |
| 2008/0074501 A1 * | 3/2008 | Matsushima | ............. | 348/207.11 |
| 2008/0215808 A1 | 9/2008 | Ashmore et al. | | |
| 2008/0250256 A1 * | 10/2008 | Hagiwara | ............. | 713/300 |
| 2009/0125570 A1 * | 5/2009 | Bailey et al. | ............. | 707/204 |
| 2009/0313702 A1 * | 12/2009 | Mandava | ............. | 726/27 |

OTHER PUBLICATIONS

Stemen, et al., "Windows Vista: Developing Power-Aware Applications", Retrieved at <<http://download.microsoft.com/download/c/d/5/cd5154e8-d825-4e14-89c8-8b0eb9dda203/pdc_2005_developingpower-awareapplications.ppt>>, Apr. 2, 2009, pp. 1-9.

* cited by examiner

Primary Examiner — Ji H Bae
(74) Attorney, Agent, or Firm — Capitol City TechLaw; Richard C. Irving

(57) ABSTRACT

Methods and a processing device are provided for monitoring a level of power in a power supply of a processing device and changing a data flushing policy, with respect to data to be written to a non-volatile storage device, based on a predicted amount of time until power loss. When the predicted amount of time until power loss is higher than a threshold, as defined by a flushing policy, requests from applications for data flushes of data to a non-volatile storage device may be discarded. When the predicted amount of time remaining until power loss drops below the threshold, the requests from the applications for data flushes of the data to the non-volatile storage device may be honored and the data may be flushed to the non-volatile storage device. In some embodiments, the flushing policy may define additional thresholds.

17 Claims, 10 Drawing Sheets

ADAPTIVE FLUSHING OF STORAGE DATA

BACKGROUND

Typically, when applications executing on a processing device write data to a storage device having a non-volatile medium, the data may not be initially written to the non-volatile medium. Instead, the data may be first written to a buffer or a write cache and then later may be written or flushed to the non-volatile medium, perhaps after a predefined amount of data has accumulated in the buffer or the write cache. As a result of performing frequent data flushes to a non-volatile medium, such as a disk or other non-volatile medium, performance degradation, with respect to the non-volatile medium, may occur. However, if the processing device experiences a sudden power loss, then any data not yet flushed to the non-volatile medium may be lost or corrupted.

Some processing devices may have an uninterruptable power supply, such as a battery, or other type of power supply. Power management software may monitor a level of power remaining in the power supply, may predict a length of time the power supply may provide power to a processing device, and may change behavior of processing device hardware in order to conserve power and extend a life of the power supply.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In various embodiments consistent with subject matter of this disclosure, methods and a processing device are disclosed for periodically monitoring an amount of power remaining in a power supply of the processing device and changing a data flushing policy of a non-volatile storage device, based on the amount of power determined to be remaining in the power supply.

The remaining power of a power supply used by the processing device may be periodically monitored and time until power loss may be predicted. When the time until power loss is predicted to be higher than a first threshold, as defined by a flushing policy, requests from applications for data flushes of storage data to be written to a non-volatile storage device may be discarded. When the predicted amount of time until power loss drops below the first threshold, the requests from applications for flushes may not be discarded and the storage data flushed to the non-volatile storage device's non-volatile medium.

In some embodiments, the flushing policy may define a second threshold, which may be less than the first threshold. When the predicted amount of time until power loss is less than the second threshold, an aggressive flushing policy may be adopted to flush the storage data more frequently than requested by the applications. In other embodiments, the flushing policy may define more than two thresholds.

In some embodiments, the flushing policy may be set by a user using a user interface to partially, or completely, change the flushing policy. Applications may change the flushing policy by calling one or more routines via an application program interface (API). Settings of one or more particular registry keys may indicate that the flushing policy is to be changed completely, or partially, according to the settings.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

In embodiments consistent with the subject matter of this disclosure, methods and a processing device are disclosed for defining or changing a flushing policy of the processing device. A power manager executing, on the processing device, may periodically monitor an amount of power remaining in a power supply. When the amount of power remaining is higher than a first threshold, defined by the flushing policy, requests from an application for data flushes of storage data to a non-volatile storage device may be discarded because the probability of losing power is close enough to zero. When the amount of power remaining drops below the first threshold, requests from the application for data flushes of the storage data to the non-volatile storage device may be allowed because the probability of losing power is significant. When the amount of power remaining drops below a second threshold, which is less than the first threshold, additional flushes may be sent to the non-volatile storage device, in order to flush the storage data to the non-volatile storage device's medium more frequently than requested from the application.

The processing device may be configured to have default flushing policies for various non-volatile storage devices. Further, the flushing policies may be altered or overridden in a number of different ways. For example, a user may use a user interface to alter a complete flushing policy or one or more portions of the flushing policy, one or more registry keys may be used to indicate desired settings for a flushing policy of the one or more non-volatile storage devices, and an application program interface (API) may be provided to permit applications to change the complete power policy or one or more portions of the flushing policy of one or more non-volatile storage devices.

In some embodiments, historical information may be kept for predicting an amount of time until power loss. The historical information may include data, such as monitored power values from a power supply, processor utilization, an amount of input/output to a non-volatile storage device, and non-volatile storage device information, as well as other data. Further, in some embodiments the non-volatile storage device may be queried for information, such as, for example, a size of a write cache, performance characteristics including, an amount of time for flushing storage data from the complete write cache, as well as other information. The historical information and the non-volatile storage device information may be used to predict an amount time until power loss.

Exemplary Processing Device

Figure 1:
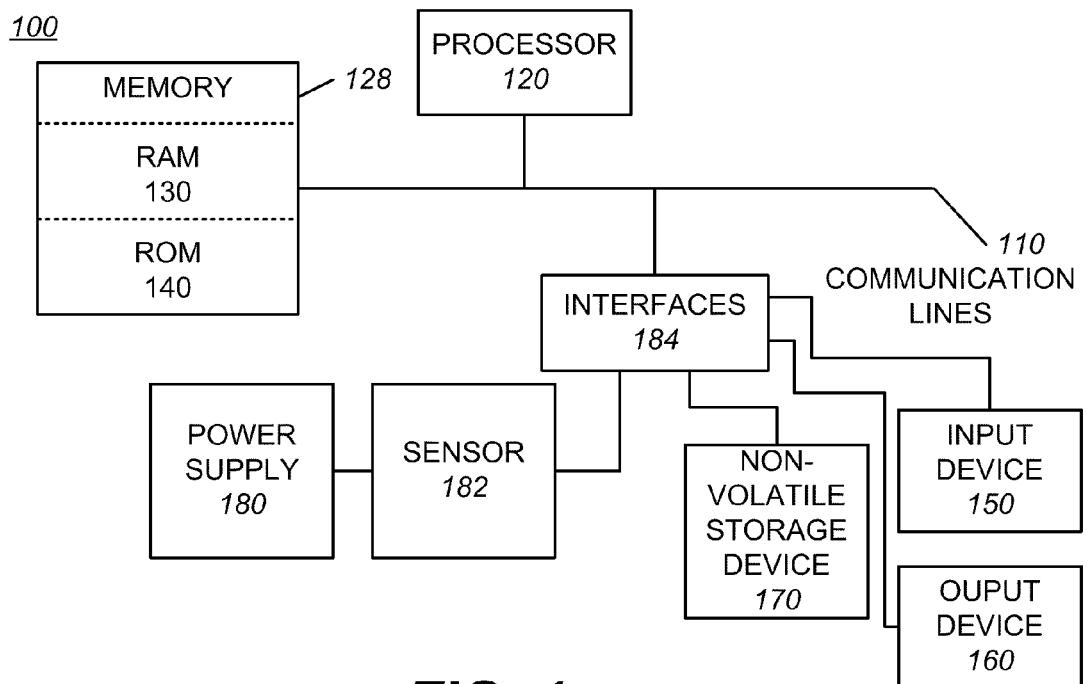
FIG. 1 is a block diagram of an exemplary processing device, which may be used to implement embodiments consistent with subject matter of this disclosure.

FIG. 1 is a diagram of an exemplary processing device 100, which may be used to implement embodiments consistent with the subject matter of this disclosure. Processing device 100 may be a personal computer (PC), a handheld processing device, or another type of processing device. Processing device 100 may include communication lines 110, a processor 120, a memory 128, an input device 150, an output device 160, a non-volatile storage device 170, a power supply 180, a sensor 182, and interfaces 184. Communication lines 110 may connect processor 120, memory 128, and interfaces 184. Input device 150, output device 160, a non-volatile storage device 170, and sensor 182 may be connected to respective ones of interfaces 184.

Processor 120 may include one or more conventional processors that interpret and execute instructions. Memory 128 may include a RAM 130, a ROM 140, and/or another type of dynamic or static storage device that stores information and instructions for execution by processor 120. RAM 130, or another type of dynamic storage device, may store instructions as well as temporary variables or other intermediate information used during execution of instructions by processor 120. ROM 140, or another type of static storage device, may store static information and instructions for processor 120.

Input device 150 may include a keyboard, a pointing device, or other devices for providing input. Output device 160 may include a display, a printer, or other device for outputting information. Non-volatile storage device 170 may include a non-volatile storage medium for storing blocks of information.

Power supply 180 may provide electrical power to processing device 100. Sensor 182 may monitor an amount of power remaining in power supply 180

Processing device 100 may perform functions in response to processor 120 executing sequences of instructions contained in a tangible machine-readable medium, such as, for example, RAM 130, ROM 140 or other medium. Such instructions may be read into RAM 130 from another tangible machine-readable medium, such as, for example, an optical disk (CD or DVD), a flash RAM, another type of tangible machine-readable medium, or from a separate device via a communication interface (not shown).

Figure 2:
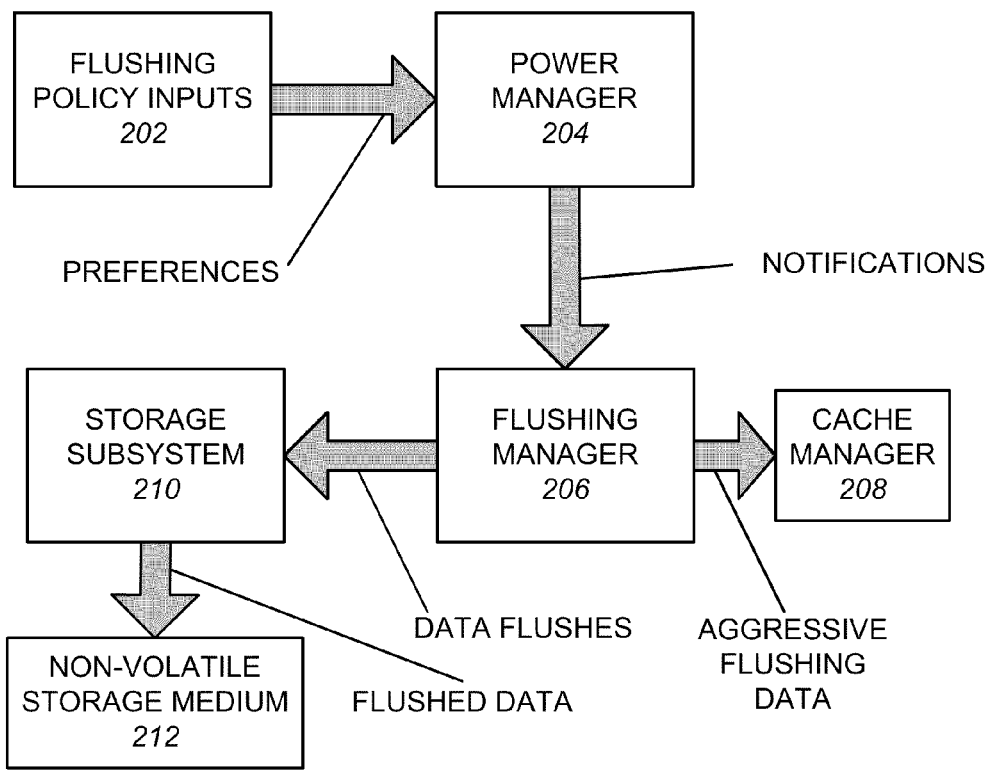
FIG. 2 is a functional block diagram of an implementation consistent with the subject matter of this disclosure.

FIG. 2 is a functional block diagram of an embodiment, within exemplary processing device 100, consistent with the subject matter of this disclosure. The exemplary embodiment includes flushing policy inputs 202, a power manager 204, a flushing manager 206, a cache manager 208, a storage subsystem 210, and a non-volatile storage medium 212 within a non-volatile storage device.

Flushing policy inputs 202 may include inputs which define a flushing policy. The flushing policy may include information regarding one or more power thresholds. A power threshold may be defined as a point at which less than a specific amount of power remains available from a power supply, or may be a point at which less than a particular estimated amount of time remains in a useful life of the power supply. The flushing policy may also include other information, such as whether a data storage device is capable of responding to queries about the data storage device, whether historical information is available regarding power consumption information and processing device load, information regarding an aggressive flushing algorithm, as well as other information. Thus, flushing policy inputs 202 may include, but not be limited to definitions for one or more power thresholds, information regarding whether a data storage device is capable of responding to queries about the data storage device, whether historical information is available, aggressive flushing algorithm information, and other information. At least some of flushing policy inputs 202 may be set according to predefined user preferences.

Power manager 204 may receive flushing policy inputs 202 and may provide policy change notifications to one or more processes registered with power manager 204. Power manager 204 may periodically monitor a power level of a power supply, such as, for example, a battery, or other uninterruptable power supply, may estimate an amount time until power loss based, at least in part, on power consumption information, and may determine whether any of one or more power thresholds have been crossed. The power consumption information may include historical power consumption information tracked against a processing device workload. If power manager 204 determines that a power threshold of the one or more power thresholds has been crossed, power manager 204 may send a notification to the one or more processes registered with power manager 204.

Flushing manager 206 is a process which registers itself with power manager 204 to receive notifications from power manager 204. The notifications may include notifications regarding crossing of any of the one or more power thresholds. Flushing manager 206 may respond to receiving the notifications by adjusting behavior with respect to flushing of data to a non-volatile storage medium of a storage device. Flushing manager 206 may aggressively send flushes to cache manager 208 after being notified by power manager 204 that the power level of the power supply has dropped below a power threshold. The aggressive flushes may include a request for the cache manager to cause data to be flushed to the non-volatile storage device's medium 212 more frequently than requested by an application.

Cache manager 208 may receive aggressive flushes from the flushing manager 206 and may request a write cache, associated with the storage device, to flush data from the write cache to the non-volatile storage device's medium 212 more frequently than requested. The write cache may include volatile storage for data that will eventually be written to the non-volatile storage device's medium 212.

Storage subsystem 210 may include code and storage stacks for writing data to a storage device in accordance with a file system.

Non-volatile storage device's medium 212 may include a magnetic disk, non-volatile memory, optical, or other type of non-volatile storage medium included in a storage device.

Exemplary Processing

Figure 3:
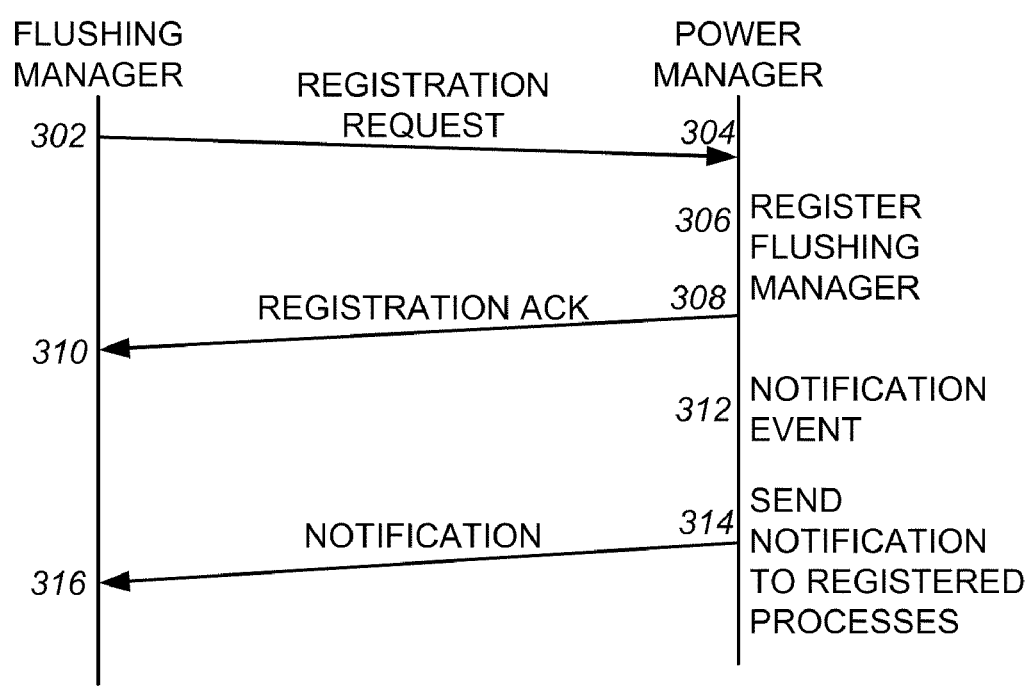
FIG. 3 is a message flow diagram illustrating an exemplary message flow regarding registration of a process to receive notifications.

FIG. 3 is a message flow diagram illustrating how a process, such as, for example, flushing manager 206, may communicate with power manager 204. Flushing manager 206 may send a registration request (act 302) to power manager 204 (act 302). Power manager 204 may receive the registration request (act 304), may register flushing manager 206 (act 306), and may send a registration acknowledgment to flushing manager 206 (act 308).

At a later point in time, a triggered notification event may occur (act 312), such as a level of a power supply crossing a predefined threshold. Power manager 204 may send a notification to flushing manager 206 to inform flushing manager 206 of the notification event (act 314). Flushing manager 206 may receive the notification and may change data flushing behavior in response to receiving the notification (act 316).

The message flow diagram of FIG. 3 shows a flushing manager 206 registering with power manager 204. However, any process may register with power manager 204 in order to receive notifications from power manager 204.

Figure 4:
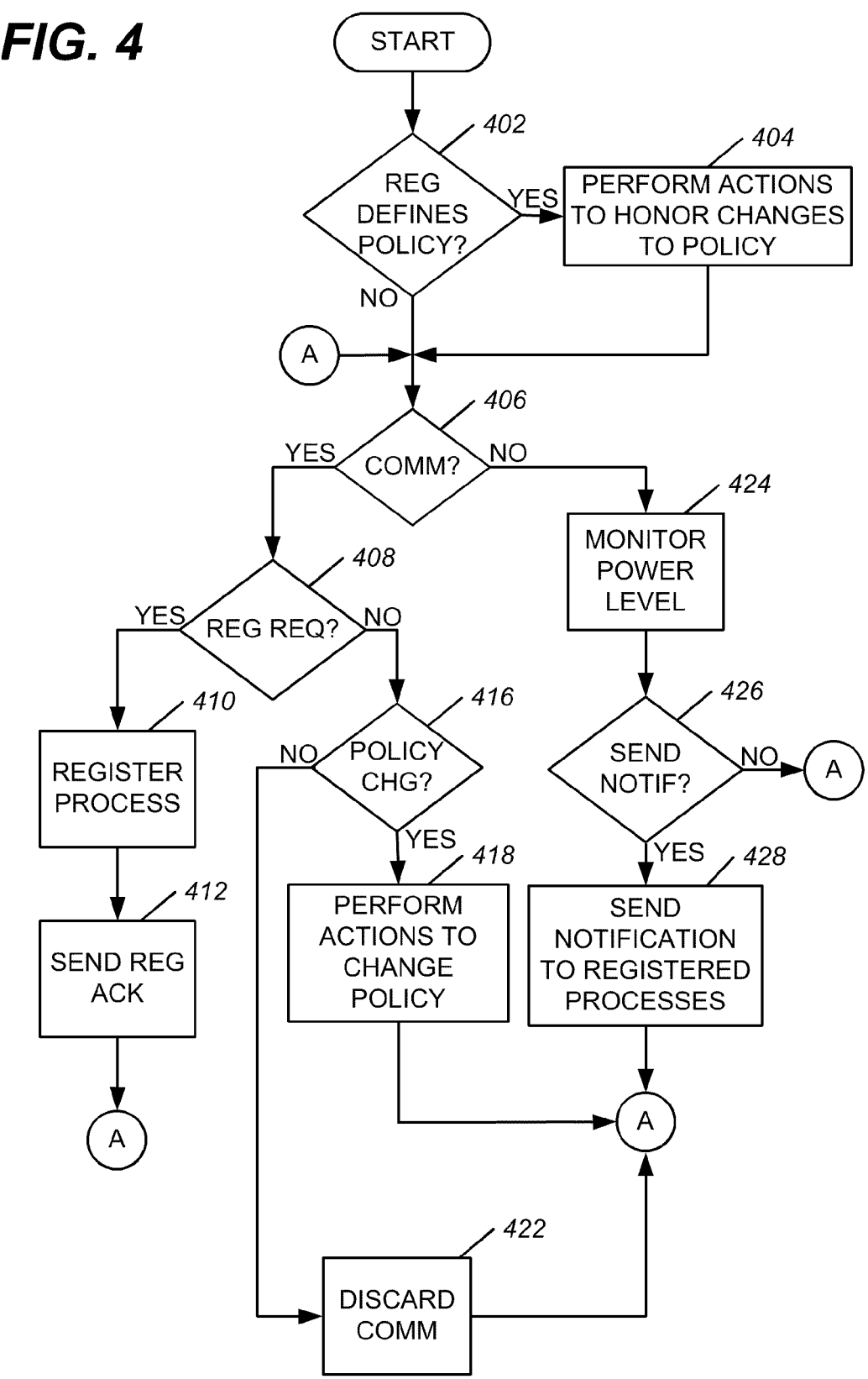
FIGS. 4-9 are flowcharts illustrating exemplary processing in various embodiments of a power manager.

FIG. 4 is a flowchart illustrating exemplary processing which may be performed by power manager 204 in embodiments consistent with the subject matter of this disclosure. The process may begin with power manager 204, executing in a processing device, determining whether one or more keys of a registry have been set defining a flushing policy (act 402). The registry may be a hierarchical data store and the one or more keys may reside in one or more locations within the hierarchical data store. If power manager 204 determines that the one or more keys of the registry have set one or more portions of the flushing policy, then power manager 204 may honor the change to the flushing policy according to a source, which in this case is the one or more registry keys (act 404).

Figure 5:
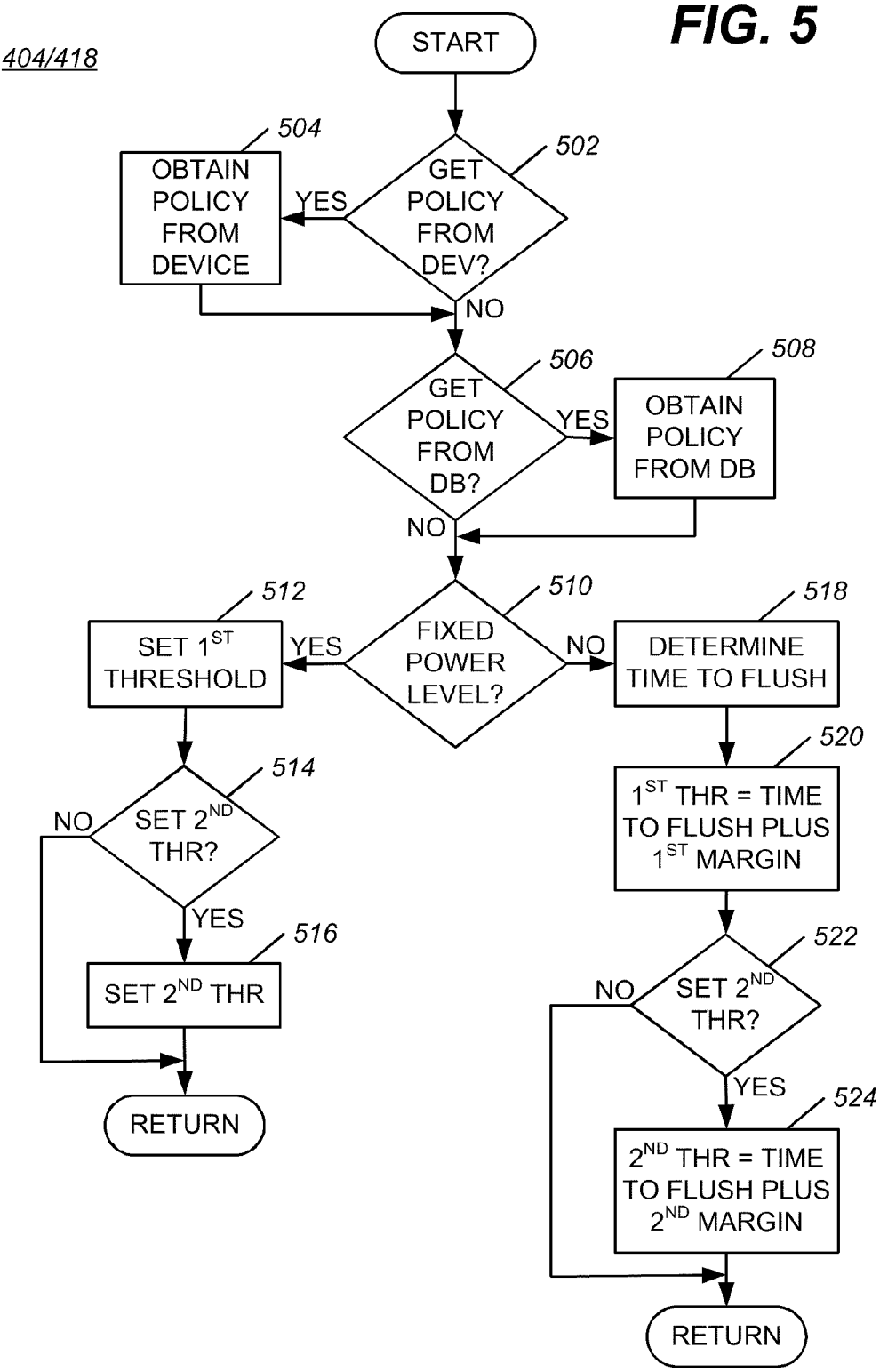

FIG. 5 is a flowchart illustrating an exemplary process for performing act 404 in an embodiment. The process may begin with power manager 204 determining whether the flushing policy is to be obtained from a storage device (act 502). If the power manager determines that the flushing policy is to be obtained from the storage device, then power manager 204 may obtain the flushing policy from the storage device by sending a request to the storage device and receiving a response to the request (act 504).

Power manager 204 may then determine whether the flushing policy is to be obtained from a database (act 506). The database may include historical information regarding power consumption, including, but not limited to, information regarding power levels, processor load, amount of I/O being performed by the storage device, as well as other information. If power manager 204 determines that the flushing policy is to be obtained from a database, then power manager 204 may obtain the flushing policy from a database (act 508).

Next, power manager 204 may determine whether the flushing policy, indicates that a threshold is to be set according to a fixed power level, such as, for example, 30% power remaining, or other level (act 510). If power manager 204 determines that a threshold is to be set according to a fixed power level, then power manager 204 may set a first threshold according to the flushing policy (act 512).

Power manager 204 may then determine whether the flushing policy indicates that a second threshold is to be set (act 514). If so, then power manager 204 may set the second threshold (act 516). In various embodiments, the second threshold may be a value which is less than the first threshold. The process may then be completed.

If, during act 510, power manager 204 determines that the threshold is not a fixed power level, then power manager 204 may assume that the threshold is a number of time units remaining in an expected useful life of a power supply. The time units may be counted in minutes, seconds, or other time unit. If the threshold is determined to not be a fixed power level, then power manager 204 may determine an amount of time units to perform a complete data flush, with respect to a storage device, under adverse conditions, such as, for example, low-power conditions or other adverse conditions (act 518). The amount of time units may be explicitly indicated by the flushing policy, or power manager 204 may determine the amount of time units based on information obtained from the storage device, from the database, or from another data source. Power manager 204 may then set a first threshold to the amount of time units to perform a complete data flush under adverse conditions plus a first margin of time units according to the flushing policy (act 520).

Power manager 204 may then determine whether the flushing policy, as modified by the source, indicates that a second threshold is to be set (act 522). If the flushing policy indicates that a second threshold is to be set, then power manager 204 may set a second threshold to the amount of time units to perform a complete data flush under adverse conditions plus a second margin of time units according to the flushing policy (act 524). In various embodiments, the second margin of time units may be a value less than the first margin of time units. The process may then be completed.

Returning to the flowchart of FIG. 4, power manager 204 may determine whether any communication from a process is received (act 406). The communication may be a registration request from a process (see FIG. 3), or a policy change message informing power manager 202 that a flushing policy change is to be processed. If the process communication is determined to be a registration request from a process desiring to receive notifications from power manager 204 (act 408) then power manager 204 may register the process (act 410) and may send a registration acknowledgment to the process to confirm the registration (act 412). Power manager 204 may then return to act 406 to determine whether a communication from a process is received.

If, during act 408, power manager 204 determines that the process communication is a policy change message, indicating a flushing policy change (act 416), then power manager 204 may perform actions to honor the change to the flushing policy according to a source, which in this case may be the policy change message (act 418). As previously discussed, the flowchart of FIG. 5 illustrates an exemplary process for performing actions to change the flushing policy. Power manager 204 may then return to act 406 to determine whether a communication from a process is received.

If, during act 416, power manager 204 determines that the received communication is not a policy change message, then power manager 204 may discard the communication (act 422) and may return to act 406 determine whether a communication from a process is received.

If, during act 406, power manager 204 determines that there is no communication from a process, then power manager 204 may monitor a power level of a power supply (act 424).

Figure 6:
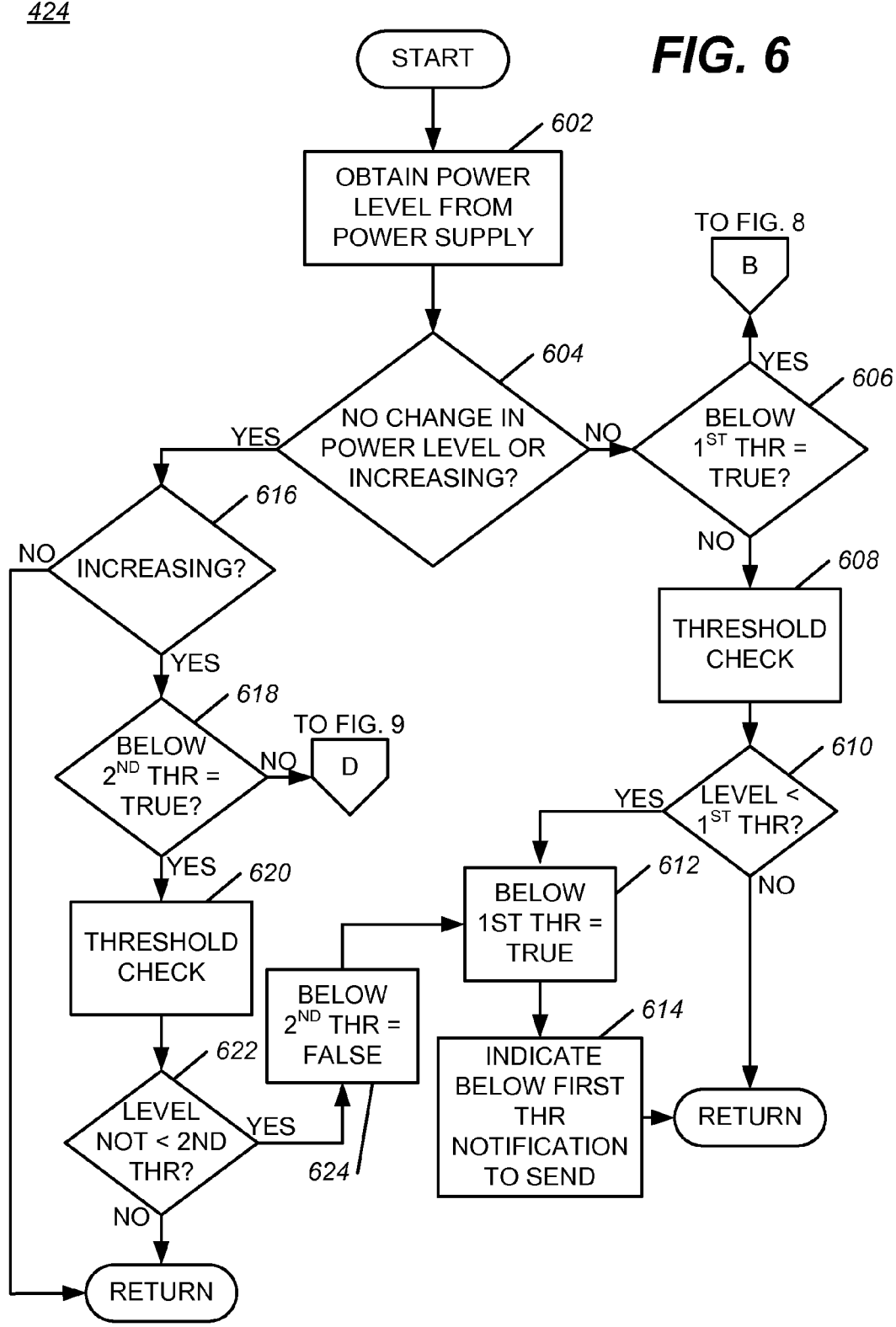

FIG. 6 illustrates a flowchart of an exemplary process for performing act 424. The process may begin with power manager 204 obtaining a power level of remaining power of the power supply (act 602). Power manager 204 may then determine whether the obtained power level indicates no change in the power level or an increase in the power level (power supply is recharging) (act 604). If power manager 204 determines that there is a change in the power level and the power level is not increasing, then power manager 204 may determine whether a flag is set indicating that the power level was below a first threshold when the power level was previously monitored (act 606). In some embodiments, the flag may be set initially to indicate that the power level is not below a first threshold. If the flag indicates that the power level was not below the first threshold when the power level was previously monitored, then power manager 204 may determine whether the current power level is above or below the thresholds by performing a threshold check (act 608).

Figure 7:
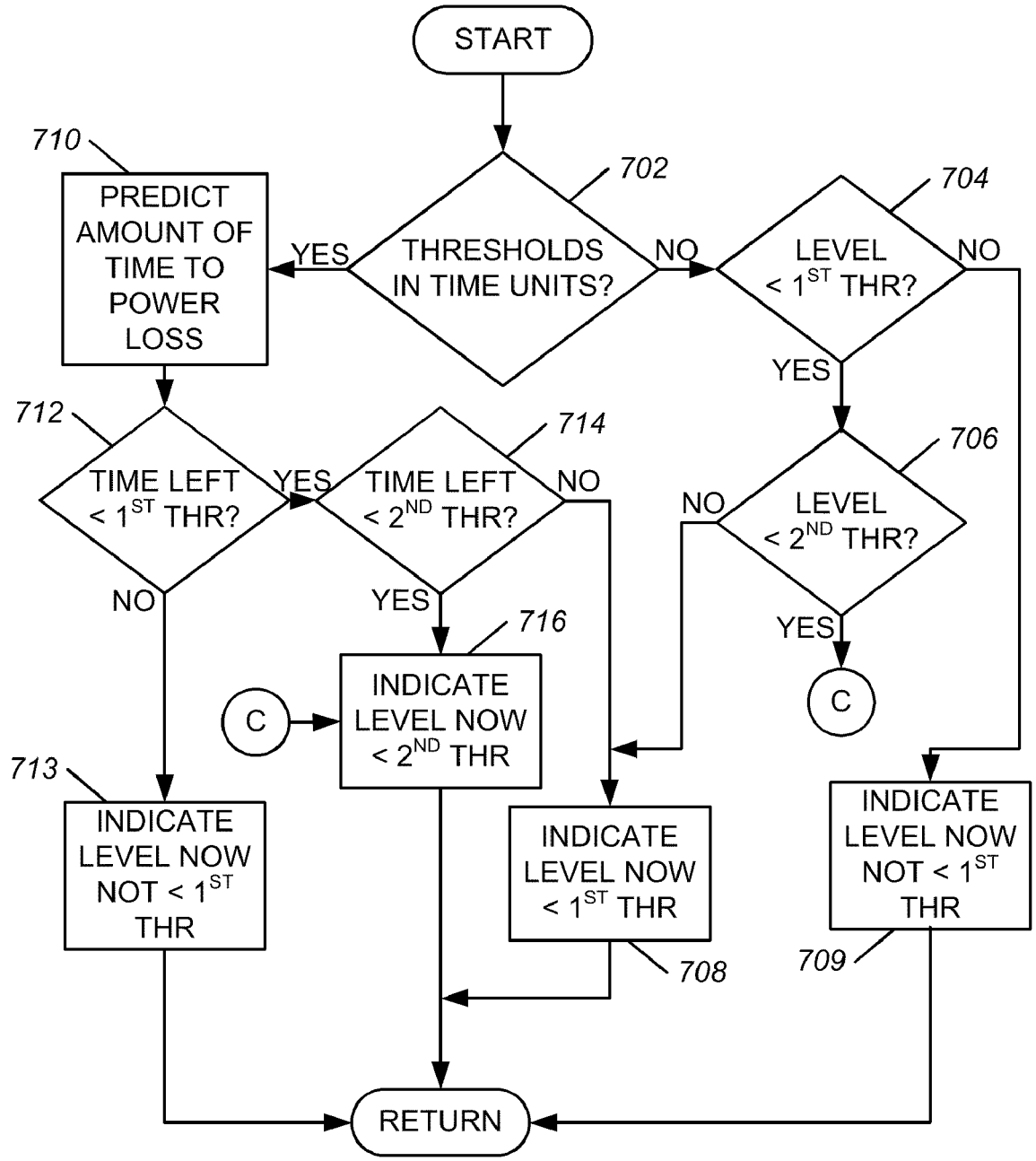

FIG. 7 is an exemplary flowchart of a process for performing a threshold check. The process may begin with power manager 204 determining whether the thresholds are in time units (act 702). If power manager 204 determines that the thresholds are not in time units, then power manager 204 may determine whether the power level is less than a first threshold (act 704). The first threshold may be set as a percentage of power remaining in the power supply, such as, for example, 30% or another suitable value.

If, during act 704, power manager 204 determines that the power level is not less than the first threshold, then power manager 204 may indicate that the power level now is not less than the first threshold (act 709) and the process may be completed.

If, during act 704, power manager 204 determines that the power level is less than the first threshold, then power manager 204 may determine whether the power level is less than a second threshold (act 706). If power manager 204 determines that the power level is not less than the second threshold, then power manager 204 may provide an indication that the power level is now less than the first threshold (act 708). The process may then be completed.

If, during act 706, power manager 204 determines that the power level is less than the second threshold, then power manager 204 may indicate that the power level is now less than the second threshold (act 716) and the process may be completed.

If, during act 702, power manager 204 determines that the thresholds are in time units, such as, for example, minutes, seconds, or other time unit, indicating an estimated amount of time units remaining in a useful life of the power supply, then power manager 204 may predict an amount of time units remaining until power loss (act 710). Power manager 204 may predict the amount of time units based on historical information regarding power consumption, process device work load, amount of input and output with respect to the storage device, and/or other information.

Power manager 204 may determine whether the predicted amount of time until power loss is less than the first threshold (act 712). If power manager 204 determines that the predicted amount of time until power loss is not less than the first threshold, then power manager 204 may indicate that the power level is not less than the first threshold (act 713) and the process may be completed.

If, during act 712, power manager 204 determines that the predicted amount of time until power loss is less than the first threshold, then power manager 204 may determine whether the predicted amount of time until power loss is less than the second threshold (act 714). If, during act 714, power manager 204 determines that the predicted amount of time until power loss is not less than the second threshold, then power manager 204 may indicate that the power level is now less than the first threshold (act 708) and the process may be completed. Otherwise, power manager 204 may indicate that the power level is now less than the second threshold (act 716) and the process may be completed.

Returning to FIG. 6, after performing act 608, power manager 204 may determine whether the threshold check indicates that the power level is less than the first threshold (act 610). If, during act 610, power manager 204 determines that the threshold check indicates that the power level is not less than the first threshold, then the process may be completed. Otherwise, the flag may be set indicating that the power level is below the first threshold (act 612) and power manager 204 may indicate that a below first threshold notification is to be sent to any registered processes (act 614). The process may then be completed.

Figure 8:
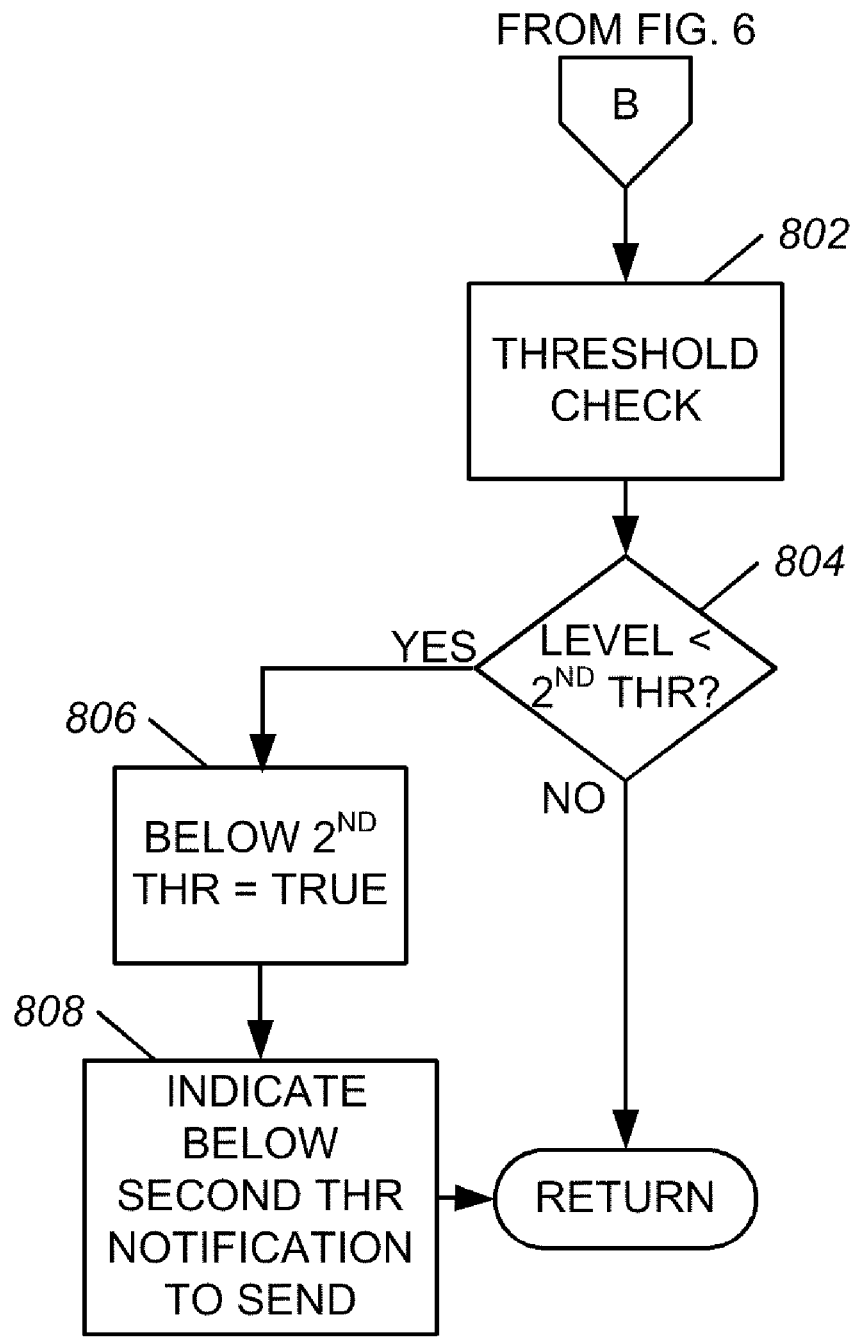

If, during act 606, the flag indicating that the power level was below the first threshold when the power level was previously monitored, then power manager 204 may perform a threshold check (act 802; FIG. 8). Power manager 204 may then determine whether the power level now is less than the second threshold (act 804). If, during act 804, power manager 204 determines that the power level now is not less than the second threshold, then a threshold has not been crossed and the process may be completed.

If, during act 804, power manager 204 determines that the power level now is less than the second threshold, then power manager 204 may set the flag to indicate that the power level is below the second threshold (act 806) and power manager 204 may indicate that a below second threshold notification is to be sent (act 808). The process may then be completed.

If, during act 604 (FIG. 6), power manager 204 determines that there is no change in the power level or the power level is increasing (power supply is recharging), then power manager 204 may determine whether the power level is increasing (act 616). If the power level is not increasing, then the power level has not changed and the process may be completed.

If, during act 616, power manager 204 determines that the power level is increasing, then power manager 204 may determine whether the flag is set indicating that the power level was below the second threshold when the power level was previously monitored (act 618). If power manager 204 determines that the flag indicates that the power level was below the second threshold when the power level was previously monitored, then power manager 204 may perform a threshold check (act 620) and may determine whether the power level is now not less than the second threshold (act 622). If power manager 204 determines that the power level is less than the second threshold, then the process may be completed because a threshold has not been crossed. Otherwise, power manager 204 may set the flag to indicate that the power level is not below the second threshold (act 624) and may set a flag to indicate that the power level is below the first threshold (act 612). Power manager 204 may then indicate that a below first threshold notification is to be sent (act 614) and the process may be completed.

Figure 9:
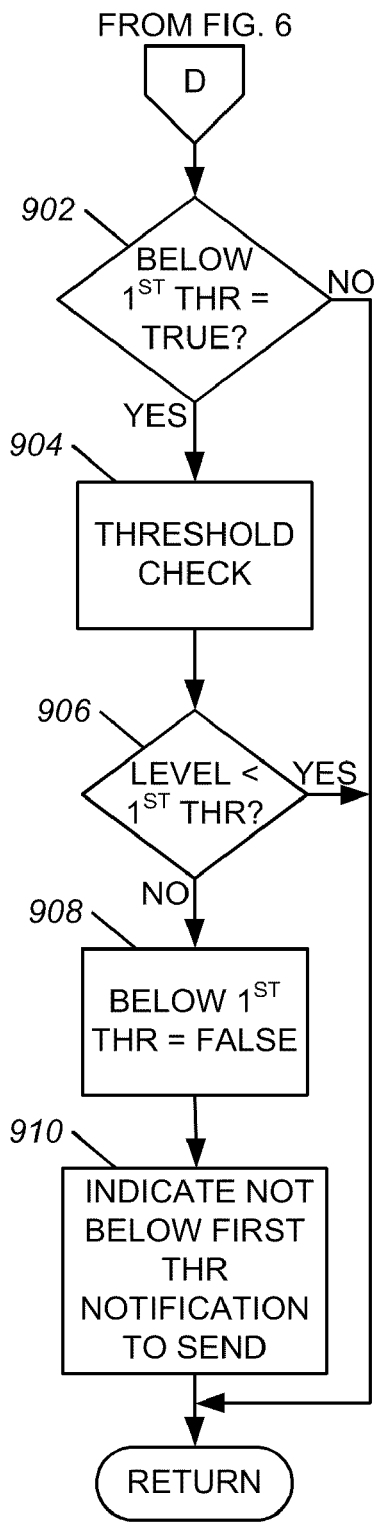

If, during act 618, power manager 204 determines that the power level was not below the second threshold when the power level was last monitored, then power manager 204 may determine whether the power level was below the first threshold when the power level was last monitored (act 902; FIG. 9). If, during act 902, power manager 204 determines that the power level was not below the first threshold when the power level was last monitored, then the process may be completed because no threshold is crossed.

If, during act 902, power manager 204 determines that the power level was below the first threshold when the power level was last monitored, then power manager 204 may perform a threshold check (act 904). Power manager 204 may then determine whether the power level is now less than the first threshold (act 906). If the power level is now determined to be less than the first threshold, then the process may be completed because no threshold is crossed.

If, during act 906, power manager 204 determines that the power level now is not less than the first threshold, then power manager 204 may set the flag to indicate that, on this monitoring of the power level, the power level was not below the first threshold (act 908). Power manager 204 may then indicate that a not below first threshold notification is to be sent (act 910) and the process may be completed.

Returning to FIG. 4, after completing act 424, power manager 204 may determine whether a notification is to be sent to processes registered to receive notifications (act 426). If a notification is not to be sent, then power manager 204 may continue by returning to act 406 to determine whether a communication from a process is received. Otherwise, power manager 204 may send the notification 330 to the registered processes (act 428) and may return to act 406.

Figure 10:
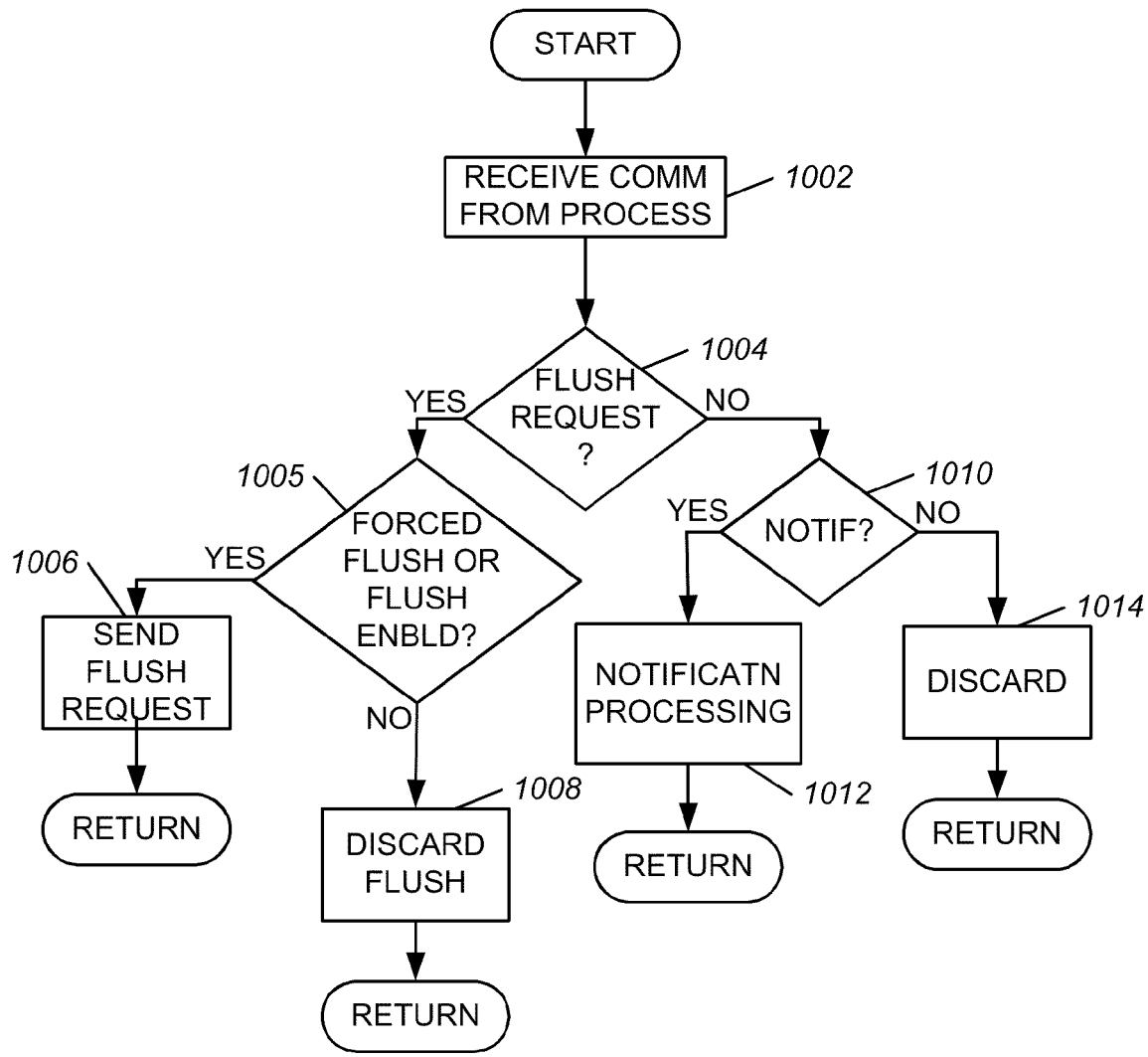
FIG. 10 is a flowchart illustrating exemplary processing in various embodiments of a flushing manager.

FIG. 10 is a flowchart illustrating an exemplary process which may be performed by flushing manager 206 in various embodiments. In this embodiment, initially, flushing is enabled and a write cache for the non-volatile storage device is configured to perform normal flushing, which, in some embodiments, may include flushing when the non-volatile storage device's write cache becomes full.

The process may begin with flushing manager 206 receiving a communication from a process (act 1002). Flushing manager 206 may 10 determine whether the received communication is a flush request (act 1004). If flushing manager 206 determines that the received communication is a flush request then flushing manager 206 may determine whether a flush request is a forced flush request or whether flushing is enabled (act 1005). A forced flush request may be received when a power loss is imminent due to a low-power condition or the processing device is being shut down.

If the received request is a forced flush request or flushing is enabled, then flushing manager 206 may send the flush request to the non-volatile storage device (act 1006). The process may then be completed.

If, during act 1004, flushing manager 206 determines that the received flush request is not a forced flush request and flushing is not enabled, then flush manager 206 may discard the flush request (act 1008) and the process may be completed.

If, during act 1004, flushing manager 206 determines that a flush request was not received, then flushing manager 206 may determine whether the received communication was a notification from power manager 204 (act 1010). If flushing manager 206 determines that the received input is a notification from power manager 204, then flushing manager 206 may perform notification processing (act 1012) and the process may be completed.

Figure 11:
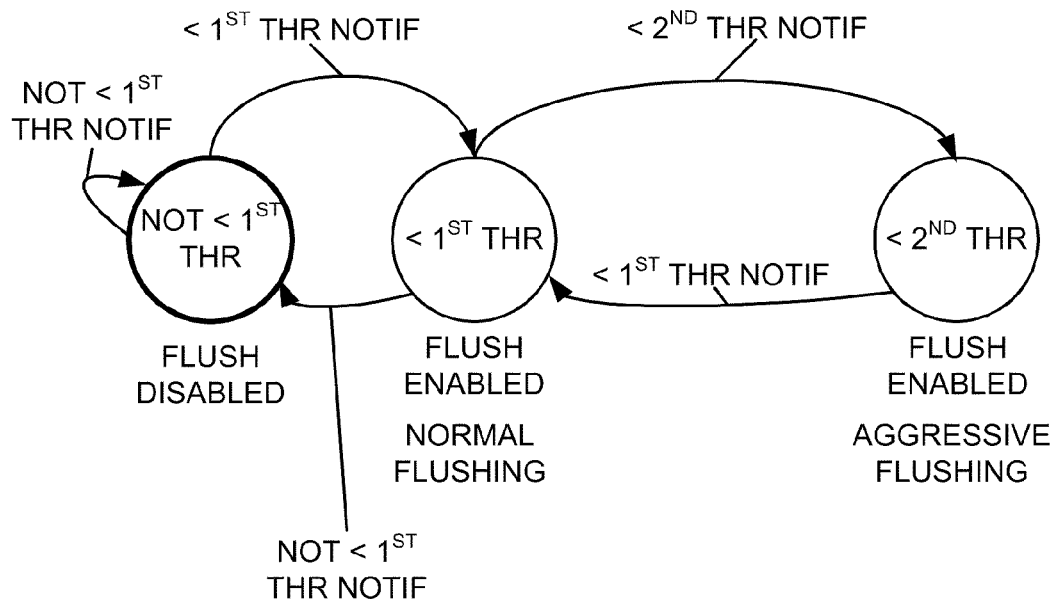
FIG. 11 is an exemplary state transition diagram illustrating state transitions for an embodiment of a flushing manager consistent with the subject matter of this disclosure.

FIG. 11 is an exemplary state diagram indicating state transitions with respect to flushing manager 206 performing notification processing during act 1012 (FIG. 10). The exemplary embodiment may begin with flushing manager 206 in a "not <1st threshold" state. When in the "not <1st threshold" state, flushing is disabled. While in the "not <1st threshold" state and a threshold notification is received indicating that the power level is not less than the first threshold, the notification may be ignored. While in the "not <1st threshold" state and a threshold notification is received, indicating that the power level threshold is less than the first threshold, then the state is changed to a "<1st threshold" state, and flushing is enabled, such that received flush requests are honored (normal flushing).

While in the "<1st threshold" state, if a notification is received indicating that the power level is not less than the first threshold, then the state may be changed to the "not <1st threshold" state, and flushing is disabled.

If flushing manager 206 receives a notification, while in the "<1st threshold" state, indicating that the power level is less than the second threshold, then flushing manager 206 may change the state to "<2nd threshold" state, flushing may be enabled, and flushing manager 206 may perform aggressive flushing (sending more flushing requests to cache manager 208 than are received by flushing manager 206). While in the "<2nd threshold" state, if a notification is received indicating that the power level is less than the first threshold, then flushing manager 206 may change the state to the "<1st threshold" state, flushing may remain enabled, and flush manager 206 may honor flush requests by sending the flush requests to cache manager 208 (normal flushing).

User Interface

Figure 12:
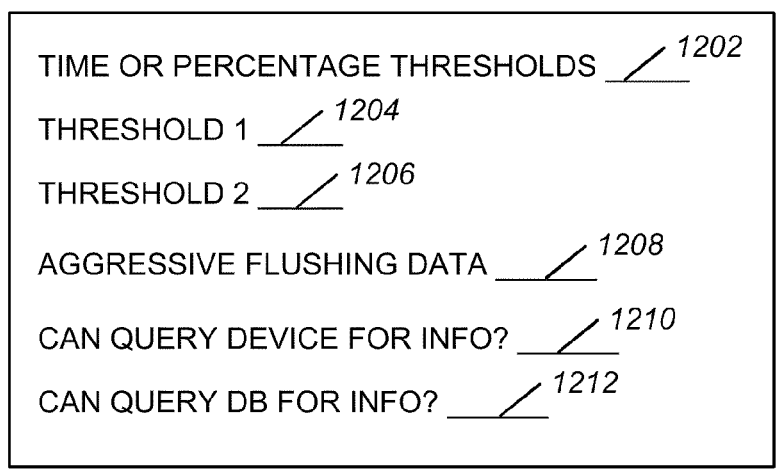
FIG. 12 illustrates an exemplary user interface for setting a flushing policy in various embodiments consistent with the subject matter of this disclosure.

In various embodiments, a user interface may be provided to permit a user to set a complete flushing policy or at least one or more portions of the flushing policy according to preferences of the user. FIG. 12 illustrates an exemplary interactive user interface 1200 which may be displayed after a user selects a displayed control or icon appearing on a display device, or after entering a command requesting a user interface. Exemplary interactive user interface 1200 illustrates exemplary prompts for a user to indicate whether thresholds are to be provided as time units or percentages of a remaining useful life of a power supply 1202, for a user to provide a setting for a first threshold 1204, for a user to provide a setting for a second threshold 1206, for a user to provide data describing an aggressive flushing method to be used 1208, for a user to provide an indication of whether a storage device is capable of handling queries for information regarding flushing 1210, for a user to provide an indication of whether a database may be queried for information which can be used by a power policy 1212, and/or other information.

Exemplary interactive user interface 1200 shows only two thresholds. However, in other embodiments, one threshold or more than two thresholds may exist, indicating that different flushing behaviors are to be carried out with respect to each of the thresholds.

Application Program Interface

In various embodiments, an application program interface (API) may be provided to permit applications to set complete flushing policy or at least one or more portions of the flushing policy. For example, an API for setting the complete flushing policy may be provided, in which desired flushing policy settings may be passed as a parameter when calling a routine of the API to change the complete flushing policy.

Other routines of the API may be provided for changing various portions of a flushing policy, such as, for example, a routine to change power level thresholds, a routine to change whether the thresholds are indicated by time units remaining in an expected useful life of a power supply or an estimated percentage of the remaining useful life of the power supply, an aggressive flushing method to be used, as well as other or different routines.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Other configurations of the described embodiments are part of the scope of this disclosure. For example, in other embodiments, an order of acts performed by a process, such as the processes illustrated in FIGS. 4-10 may be different, may be performed in a different order, and/or may include additional or other acts.

Accordingly, the appended claims and their legal equivalents define embodiments, rather than any specific examples given.

We claim as our invention:

1. A machine-implemented method for adaptively flushing storage data, the machine-implemented method comprising:
   determining, by a processing device, whether to enable or disable flushing of the storage data to a non-volatile storage medium of a storage device based, at least in part, on a configured flushing policy, a determined amount of power remaining in a power supply, and information about a power consumption of the power supply;
   enabling, by the processing device, the flushing of the storage data to the non-volatile storage medium when the processing device determines that the flushing is to be enabled;
   disabling, by the processing device, the flushing of the storage data to the non-volatile storage medium when the processing device determines that the flushing is to be disabled;
   receiving a flush request for flushing the storage data to the non-volatile storage medium;
   sending the flush request to the storage device to cause the storage device to flush the storage data to the non-volatile storage medium when the flushing is enabled; and
   discarding and not sending the flush request to the storage device when the flushing is disabled.

2. The machine-implemented method of claim 1, further comprising:
   predicting, by the processing device, whether the power supply is likely to continue providing power for at least a length of time to perform a complete power flush of the storage data under an adverse condition plus a marginal length of time.

3. The machine-implemented method of claim 1, further comprising:
   providing a plurality of methods to set the flushing policy.

4. The machine-implemented method of claim 3, wherein the plurality of methods to set the flushing policy includes one of a user interface, an application program interface, or one or more registry keys.

5. The machine-implemented method of claim 1, further comprising:
   receiving a request for a forced data flush; and
   performing a complete flush of the storage data to the non-volatile storage medium regardless of whether the flushing of the storage data to the non-volatile storage medium is enabled or disabled, in response to receiving the request for the forced data flush.

6. A processing device comprising:
   a power manager to monitor a power supply in accordance with a flushing policy and power consumption information including historical power consumption information tracked against a processing device workload; and
   a flushing manager to enable or disable flushing of storage data to a non-volatile storage medium of a storage device based, at least in part, on the flushing policy, wherein:
   when the flushing manager receives a flush request and the flushing of the storage data is enabled, the flush request is sent to the storage device to cause the storage data to be flushed to the non-volatile storage medium, and
   when the flushing manager receives the flush request and the flushing of the storage data is disabled, the flush request is discarded and not sent to the storage device.

7. The processing device of claim 6, wherein the flushing manager enables or disables the flushing further based on performance characteristics of the storage device including the non-volatile storage medium.

8. The processing device of claim 6, wherein:
   the power manager is arranged to receive a registration request from at least one process requesting to receive notifications concerning a power level of the power supply, the power manager further sending the notifications to an originator of the received registration request.

9. The processing device of claim 6, further comprising:
   an application program interface to permit changes to be made to the flushing policy by an application.

10. The processing device of 6, further comprising:
    a user interface to permit a user to set the flushing policy.

11. A machine-readable storage device having instructions recorded thereon for at least one processor, when the at least one processor executes the instructions a method is performed comprising:
    monitoring a power level of a power supply;
    predicting an amount of time until power loss based, at least partly, on the monitored power level of the power supply;
    enabling flushing of storage data to a non-volatile storage medium of a storage device, which includes the non-volatile storage medium, when the predicted amount of time until power loss is less than or equal to an amount of time indicated by a flushing policy;
    disabling the flushing of the storage data to the non-volatile storage medium when the predicted amount of time until power loss is greater than the amount of time indicated by the flushing policy;
    receiving a flush request for flushing the storage data to the non-volatile storage medium;
    sending the received flush request to the storage device, including the non-volatile storage medium, to cause the storage data to be flushed to the non-volatile storage medium when the flushing of the storage data is enabled; and
    discarding and not sending the received flush request to the storage device, including the non-volatile storage medium, when the flushing of the storage data is disabled.

12. The machine-readable storage device of claim 11, wherein the predicting an amount of time until power loss further comprises:
    retrieving current processing device workload information and historical power consumption data, and
    predicting the amount of time until power loss based on the monitored power level of the power supply, the current processing workload, and the historical power consumption data.

13. The machine-readable storage device of claim 11, wherein the method further comprises:
    sending a notification to a registered process when the monitored power level of the power supply has crossed a threshold specified by the flushing policy.

14. The machine-readable storage device of claim 11, wherein the method further comprises:

performing aggressive flushing of data to the non-volatile storage medium when the monitored power level of the power supply is less than a predefined threshold defined by the flushing policy.

15. The machine-readable storage device of claim 11, wherein the method further comprises:
flushing the storage data to the non-volatile storage medium more frequently than requested when the predicted amount of time until power loss is less than a second amount of time indicated by the flushing policy.

16. The machine-readable storage device of claim 11, wherein the method further comprises:
receiving a forced flushing request; and
flushing the storage data to the non-volatile storage medium in response to receiving the forced flushing request regardless of whether the flushing is enabled or disabled.

17. The machine-readable storage device of claim 11, wherein the method further comprises:
setting the flushing policy based on a value of at least one registry key.

* * * * *